United States Patent [19]

Aitken

[11] Patent Number: 5,511,802
[45] Date of Patent: Apr. 30, 1996

[54] SINGLE WHEEL BABY STROLLER

[75] Inventor: Warwick Aitken, 21 SubBrae Grove, Mount Maunganui, New Zealand

[73] Assignee: Warwick Aitken, Mount Maunganui, New Zealand

[21] Appl. No.: 355,016

[22] Filed: Dec. 13, 1994

[51] Int. Cl.$^6$ ........................................ B62B 9/00
[52] U.S. Cl. ..................... 280/1.5; 280/47.32; 280/78
[58] Field of Search ........................ 280/1.5, 47.3, 280/47.32, 47.33, 78, 645, 647, 650, 652, 655, 655.1, 658

[56] References Cited

U.S. PATENT DOCUMENTS

| 2,490,988 | 12/1949 | Wheeler | 280/650 |
| 4,229,039 | 10/1980 | Day | 280/650 X |
| 4,664,395 | 5/1987 | McCoy | 280/1.5 |
| 4,953,880 | 9/1990 | Sudakoff et al. | 280/47.38 |
| 5,106,108 | 4/1992 | Howell | 280/1.5 |
| 5,375,861 | 12/1994 | Gifford | 280/1.5 |
| 5,385,355 | 1/1995 | Hoffman | 280/1.5 |

FOREIGN PATENT DOCUMENTS

| 191070 | 10/1907 | Germany | 280/47.3 |
| 213538 | 4/1908 | Germany | 280/647 |
| 901896 | 11/1953 | Germany | 280/47 |

Primary Examiner—Margaret A. Focarino
Assistant Examiner—Victor E. Johnson
Attorney, Agent, or Firm—Hill, Steadman & Simpson

[57] ABSTRACT

A single wheel running stroller for carrying a child which has a large front wheel with a U-shaped frame and foot supports for receiving the child's feet and has a curved main frame member which extends from the U-shaped frame to a handle at the upper end thereof. Cross-bars are attached to the frame member and a canvass seat is attached to the cross-members for receiving the child's body. A kick stand is attached to the main frame and can be moved into a support position when the stroller is stationary and can be moved to an upper position out of engagement with the ground when in use. A waist band bracket is attached with a universal joint to the main frame member of the stroller and the waist band fits around the user's waist to drive and stabilize the device. An upper extending handle is provided. The stroller may be folded and stored by use of a pivot in the main frame member which allows it to be folded over for storage purposes.

5 Claims, 2 Drawing Sheets

SINGLE WHEEL BABY STROLLER

BACKGROUND OF THE INVENTION

1. Field of the Invention

This invention relates generally to carriages and strollers for infants, children and in particular to a single wheel stroller which is attached to the user while the user is engaged in jogging or running, and which does not require the use of the user's hands to stabilize it.

2. Description of Related Art

U.S. Pat. No. 4,953,880 discloses a three wheel jogging stroller which is pushed by a jogger and which carries a child therein. Such device has two handles on a cross-bar which are gripped by the user so as to push the device and to stabilize it.

U.S. Pat. No. 4,664,395 discloses a multi-purpose uniaxial litter device which can be attached to the back of a user for carrying cargo which is attached to the frame of the device.

SUMMARY OF THE INVENTION

The present invention comprises a single wheel baby carriage or stroller with which a user can jog or run without the necessity of holding or pushing it with the arms. By freeing the arms from engaging and holding the carriage, the respiratory system of the user when running is improved over devices where the hands must be held stationary on a strolling device.

The present invention comprises a single supporting frame which allows the runner's legs to pass on either side thereof to allow freedom of movement.

The stroller of the invention can be folded so that it is compact and can be stored in a small space. The stroller of the invention can be used for children less than a year through five years of age and the weight of the child may be up to and greater than 30 kilograms. The present invention allows the stroller to carry a substantial portion of the baby's or child's weight and prevents such weight from being carried by the user. The stroller of the present invention has a large wheel and can be used on ground conditions that can vary from smooth to rough. A safety belt and stabilizing device attaches to the user and to the frame of the stroller so as to stabilize it and free the arms of the user from stabilizing the device.

It is a feature of the invention to provide a single wheel baby buggy or load-carrying stroller that can be attached to the user with a waist belt which allows the user to push and provide steering control of the device. A handle is provided for further steering adjustment and a pivot is located in the main frame to allow the entire apparatus to be collapsed for easy storage. A frame and waist belt attachment allow the user considerable leg room which allows a comfortable running stance. The ease of running is increased since the user can control the device without using his arms which are free to swing in a normal manner.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

DESCRIPTION OF THE PREFERRED EMBODIMENTS

Figure 2:
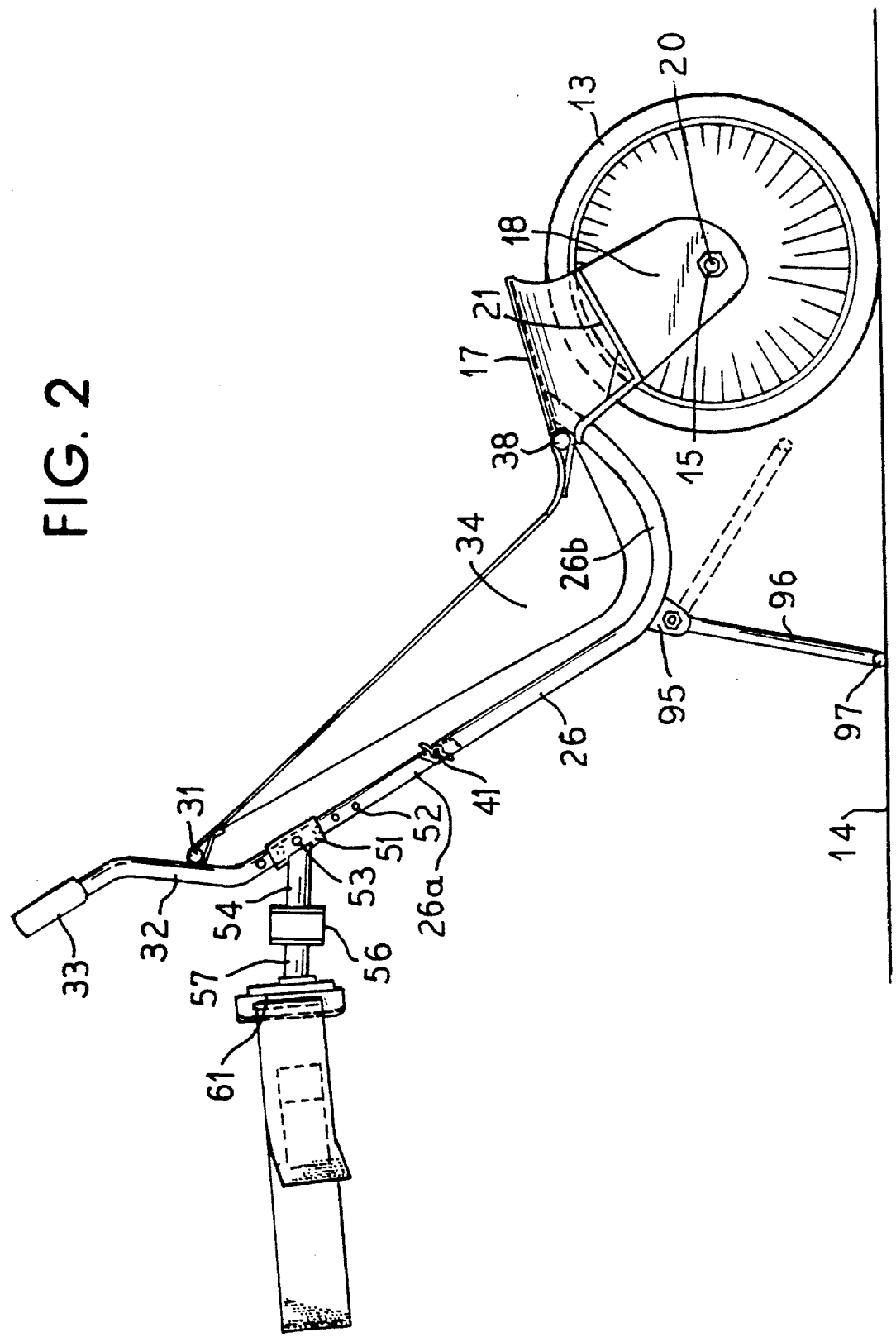
FIG. 2 is a side plan view of the invention.

As shown in the FIGS., the uniwheel stroller 10 of the invention comprises a ground wheel 13 of relative large diameter which in a specific embodiment has a 16 inch diameter and 2.125 inch width. The wheel 13 is connected by an axle 20 and nuts 15 and 16 to a U-shape frame member 17 which has downwardly extending sides 18 and 19 through which the axel 20 extends as shown in the FIGS. Feet supports 21 and 22 are connected to the U-shape member 17 for the feet of the child 11. A cross-bar 38 is connected to the member 17 and to the lower end of a main frame member 26 which has a lower end 26b that is curved and which is connected by a pin and thumb screw pivot 41 to an upper main frame portion 26a as best shown in FIG. 2.

The upper end of main frame member 26a is formed into a handle 32 which carries a rubber grip 33 on its upper end thereof. A cross-bar 31 is attached to the upper frame member 26a and a canvas seat 34 is mounted between the bars 31 and 38 and is formed with outer edges 36 and 37 and has a seat in which the child 11 can be supported. Harness 91 with conventional fasteners passes over the shoulders of the child and through his legs as well as around his waist and is attached to the bar 38 and canvass 34 so that the child is firmly held in the device.

A hollow cylindrical bracket 51 fits about the upper frame member 26a and has a moveable pin which can be adjustably mounted in openings 52 formed through the frame member 26a so as to adjust the height of a waist support bar 54. A shock absorber 56, of a flexible material such as rubber connects the bar 54 to a second bar 57 which is connected to a horizontally extending metal plate 61 which has an opening 68 at one end to which the end 67 of a waist belt 62 is attached. The member 61 has an opening 71 at its other end 69 through which the end 72 of the waist belt can be inserted so that the end 72 of the belt can be attached by a fastening means 73 to the belt to lock the device to the user 12. The attaching means 73 might be velcro or a buckle or other suitable holding means.

A bracket 95 is attached to the main supporting frame member 26 adjacent its lower curved portion 26a and pivotally supports a stand 96 which has a cross-member 97. The stand 96 is normally in the dashed position shown in FIG. 2 when the user is running and when the user stops the support 96 may be moved to the solid line position shown in FIG. 2 such that the cross-bar 97 engages the ground and provides with the wheel 13 a stable point support of the device.

Figure 1:
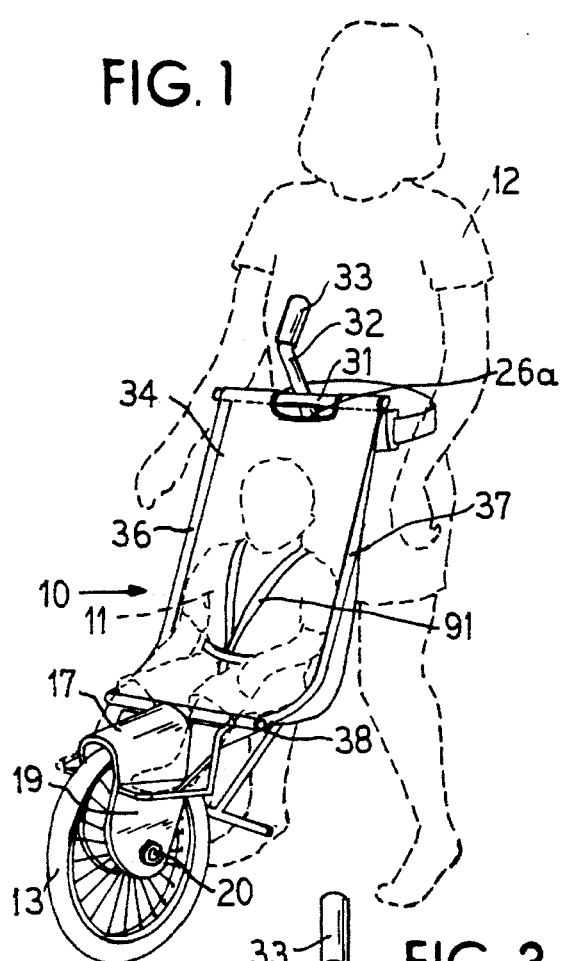
FIG. 1 is a perspective view of the stroller of the invention attached to a user.
Figure 4:
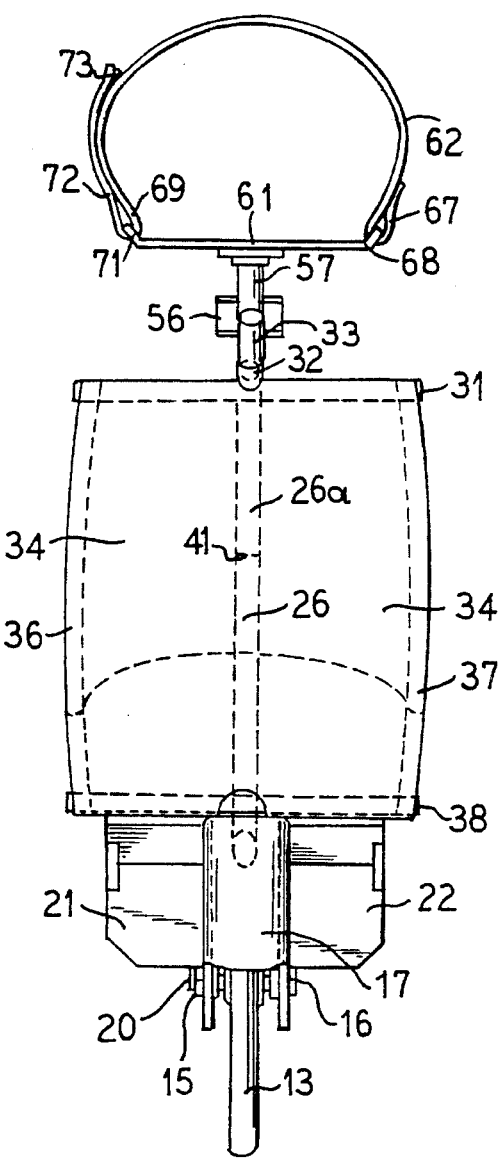
FIG. 4 is a top plan view of the invention.
Figure 3:
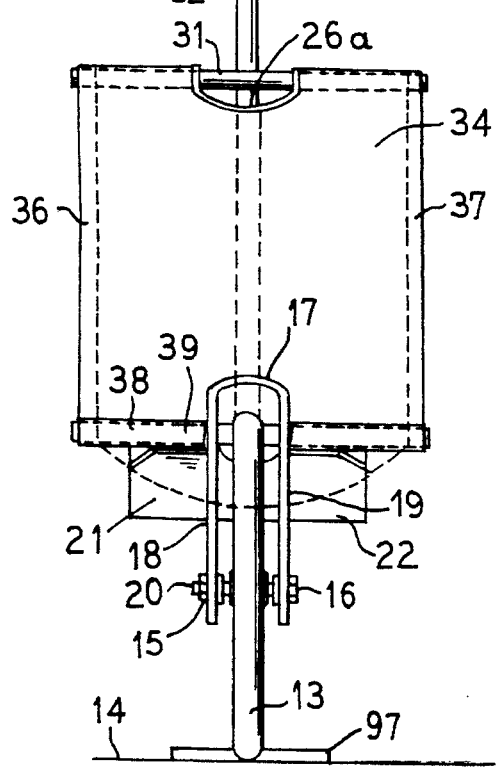
FIG. 3 is a front plan view of the invention.

In use, the stand 96 is placed in the down position and the child 11 is placed in the seat 34 and the harness 91 is adjusted and is adjusted to lock the child 11 in the stroller 10. Then the user adjusts the bracket 51 to a suitable height and places the belt 62 about her waist and fastens the end 72 of the belt as shown in FIG. 4. Then the stand 96 is moved to the dashed position as shown in FIG. 2 and the user can jog or run with the child safely attached to the stroller. Since there is only a single main frame 26 which is substantially in line between the legs of the user, the user's legs can freely move forward and backward without engaging the stroller. The handle 32 and grip 33 can be used as a stabilizing device when as it is being attached to the user and when the user may want to rest one of her arms by holding onto the grip 33. The child's legs are protected from the spokes of the wheel 13 by the downwardly extending frame members 18 and 19 and by the foot supports 21 and 22 and the size of the wheel 13 allows it to roll over rough surfaces and the belt 62 and cross-member 61 provide a stable platform for the device so that it will move in the direction and track the direction in which the user 12 is moving. When not in use, the pivot 41 can be loosened and the stroller can be folded over to allow it to be stored.

Although the invention has been described with respect to preferred embodiments, it is not to be so limited as changes and modifications can be made therein which are within the full intended scope as defined by the appended claims.

I claim as my invention:

1. A one wheel stroller for a child that can be pushed ahead of a user while running or jogging by a user who pushes the stroller with the hands free comprising a frame member, a ground engaging wheel rotatably supported on a lower portion of said frame member, a child seat attached to said frame member, a horizontally extending plate attached to an upper portion of said frame member and a waist belt attached to opposite ends of said horizontally extending plate which can be placed about the waist of the user to allow the stroller to be moved, said frame member comprises a single longitudinally extending member connecting said upper and lower portions and extending substantially in line between the legs of the user so that the user's legs can freely move backward and forward without engaging the stroller, a horizontal upper bar extending laterally from said upper portion, a lower cross-member extending laterally from said lower portion and a harness attached to said child seat which can be fastened to hold the child to said seat whereby said seat is supported by said upper bar and said lower cross member.

2. A one wheel stroller according to claim 1 wherein said frame member has a handle attached to said upper portion.

3. A one wheel stroller according to claim 1 wherein said child seat is formed of flexible material which is attached between said upper bar and said lower cross-member which is connected to said lower portion of said frame member.

4. A one wheel stroller according to claim 1 including a stand pivotally attached to said frame member.

5. A one wheel stroller according to claim 1 wherein the upper and lower portion of said frame member are connected by a pivot means that allows the stroller to be folded into a storage position when not in use.

\* \* \* \* \*